April 23, 1963   J. E. DILATUSH   3,086,676
RECEPTACLE
Filed April 27, 1961
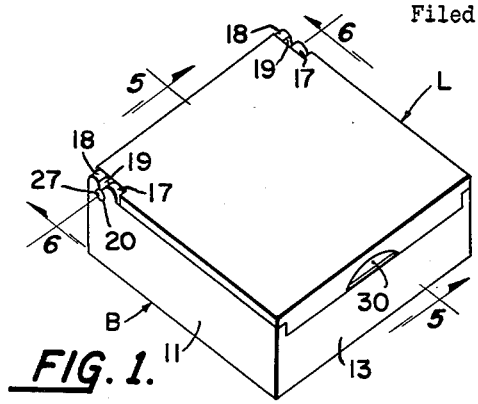
FIG. 1.
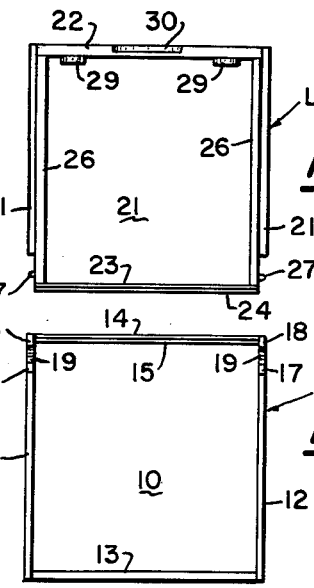
FIG. 2.
FIG. 3.
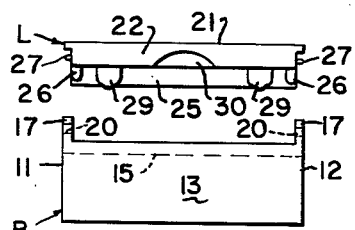
FIG. 4.
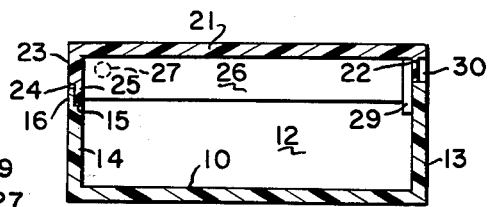
FIG. 5.
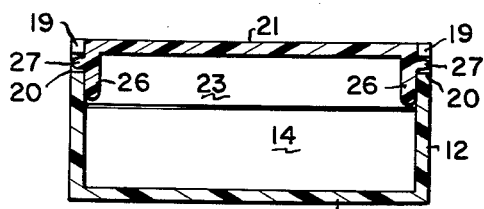
FIG. 6.
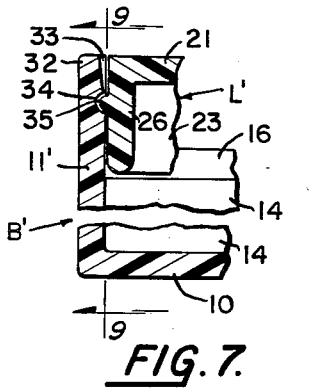
FIG. 7.
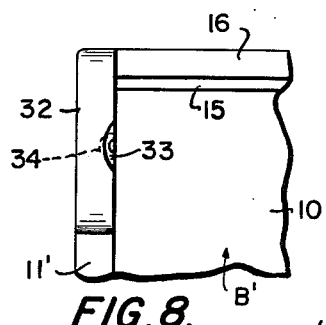
FIG. 8.   FIG. 9.
INVENTOR.
JOHN E. DILATUSH
BY
Horace B. Van Valkenburgh
ATTORNEY 3,086,676
RECEPTACLE
John Edward Dilatush, Littleton, Colo., assignor to Ingwersen Manufacturing Co., Inc., Denver, Colo., a corporation of Colorado
Filed Apr. 27, 1961, Ser. No. 106,079
3 Claims. (Cl. 220—31)

This invention relates to an improved construction of a receptacle or box, more particularly a plastic box for use as a receptacle, as for fishing lures and the like, or any other desired product, which does not require a liquid or air tight seal.

Plastic boxes of various types have generally been known for a long time. However, all of these boxes have certain inherent disadvantages. Some were of flimsy construction so that they were easily crushed or damaged, causing damage or injury to the product within the box, while others were of such heavy construction as to be difficult to open and close. In the case of many of the boxes, the lids often came open, causing the product to be lost or at least to fall from the box, but those which did not tend to accidentally come open were difficult to assemble, thus raising the cost of manufacture to a sometimes prohibitive level. Furthermore, such prior boxes generally have projecting portions on the lids or on both the lid and the body, making it easy for the lid to be dislodged or opened. Also, such projections make it difficult to pack a number of boxes in a carton or the like with the adjacent surfaces thereof in closely fitting relation.

Among the objects of this invention are to provide a novel receptacle, as in the form of a plastic box; to provide such a receptacle which is light in weight but is strong, durable and sturdy; to provide such a receptacle having a smooth exterior, which cannot be accidentally opened, yet is provided with means so that it may be easily opened; to provide such a receptacle which forms a generally tight container for the product which it holds; to provide such a box which may be easily manufactured; and to provide such a box which is easy and simple to assemble.

Additional objects and the novel features of this invention will become apparent from the description which follows, taken in connection with the accompanying drawings, in which:

FIG. 1 is a top front perspective view of a receptacle of this invention;

FIG. 2 is a bottom plan view of the lid of the receptacle of FIG. 1;

FIG. 3 is a top plan view of the base or body of the receptacle of FIG. 1;

FIG. 4 is a front elevation of the receptacle, showing the base and lid separated, prior to assembly;

FIG. 5 is a central vertical section, taken along line 5—5 of FIG. 1;

FIG. 6 is a rear vertical section, taken along line 6—6 of FIG. 1, showing particularly the hinge construction;

FIG. 7 is a fragmentary, condensed cross section, similar to a portion of FIG. 6 but on an enlarged scale and showing an alternative hinge construction;

FIG. 8 is a fragmentary top plan view of a rear corner of the base of the receptacle of FIG. 7; and FIG. 9 is a fragmentary, condensed vertical section, taken along line 9—9 of FIG. 7.

A receptacle of this invention comprises a base B, which is rectangular in shape, and a lid L which is hinged to the base at the rear thereof and latchingly engages the front wall, as seen in FIG. 1. Both the base B and lid L are conveniently molded from transparent or translucent polystyrene or other plastic which is relatively rigid but still has sufficient flexibility to permit easy assembly, as in the manner described later, and also to permit the latching arrangement to hold the lid securely on the base. More particularly, as in FIG. 3, base B has a rectangular bottom 10, a pair of upstanding side walls 11 and 12, and an upstanding front wall 13 and rear wall 14. The upper edge of front wall 13, as in FIG. 4, is spaced below the top of the side walls, while the upper edge of the rear wall 14, shown in dotted lines in FIG. 4 for clarity of illustration although visible from the front when the receptacle is formed of clear plastic, is spaced further below the top of the front wall and also is provided with a generally rectangular groove 15, on the inside, to form an upstanding flange 16 of FIG. 5 and to interfit with the lid in a manner described below. Projecting upwardly at the rear of each side wall 11 and 12 are integral ears 17 and 18, on opposite sides of a downwardly converging notch 19, which extends to a hole 20, notches 19 providing an easy and rapid assembly of the base and lid and holes 20 form a part of means for hingedly attaching the lid L, as hereinafter will appear.

Lid L has a rectangular top 21, which is conveniently the same size as bottom 10 of base B and extends laterally over the upper edges of side walls 11 and 12 of the base, except ears 17 and 18, as well as forwardly and rearwardly to positions corresponding to the front surface of base front wall 13 and the rear surface of base rear wall 14, respectively. Lid L is also provided with front and rear, depending flanges 22 and 23, respectively, which extend between the side walls of the base in closed position and downwardly to the respective front and rear walls thereof. In closed position, ears 17 and 18 conveniently extend to the upper surface of lid L, while the lower edge of rear flange 23 of lid L, as in FIGS. 2 and 5, is provided with a groove 24 on the outside to provide a depending flange 25 on the inside. The lid is reinforced by spaced parallel ribs 26 which are spaced inwardly from the side edges of lid top 21 a distance slightly greater than the thickness of the respective side wall of the base. This construction permits the ribs to fit close to the inside of the side walls when the lid is closed, thus preventing the loss of small objects from the receptacle, even though placed on edge or turned upside down. Similarly, the flanges 16 and 25, as in FIG. 5, prevent the loss of small objects from the receptacle at the rear, it being noted that grooves 15 and 24 may be deeper than the flanges 25 and 16 respectively received therein, to permit easier pivotal movement of the lid.

An integral hinge pin 27, having a slightly lesser diameter, as by a few thousandths of an inch, than the corresponding hole 20, extends outwardly from each rib 26, as in FIGS. 2 and 4, and each pivots in a hole 20, when the lid is opened and closed. The front flange 22 of the lid is provided, on the inside, with a pair of integral, downwardly extending tongues or tabs 28, which frictionally and resiliently engage the inside of front wall 13 of the base B and thus hold the lid in closed position. The front surfaces of tabs 28 are preferably disposed a distance from pins 27 that force is necessary either to push the lid to closed position or pull the lid from closed position. The thrust of tabs 28 against base front wall 13 is transmitted not only through pins 27 to side walls 11 and 12 of base B, but also through flange 25 of the lid to flange 16 of base B, the flanges 16 and 25 thus relieving some of the stress on pins 27. Since the lower edge of front flange 22 of the lid is held against the upper edge of front wall 13 of base B by the friction of tabs 28, and there is no necessity for clearance to accommodate relative movement, there is no opportunity for small objects accidentally to fall between these edges. It is understood, of course, that the receptacle of this invention is not intended to be water tight or air tight, but merely to contain solid objects.

For opening the lid L, a notch 30, conveniently having an arcuate upper edge, is formed at a central position in front flange 22 of the lid. As will be evident, upward pressure in notch 30, as by either pushing or pulling with a thumb or finger, will move the lid from closed to open position. As will also be evident, the exterior of the receptacle or box is smooth, without projecting portions and particularly without projecting portions which, if struck accidentally, would cause the lid to be opened. Flanges 16 and 25 may also provide a further function, since an instruction or advertising slip may be placed in the box, to extend between the flanges 16 and 25, which will thus hold the extending portion in an upright position, projecting above the top of the box, if desired. It will be noted that such upward projection of such a slip does not interfere with the stacking of the receptacles close together, since such upward projection of an instruction or advertising slip is quite thin and is along the abutment between two boxes above.

There is also a special function of the tabs 28 in assembly of the box, i.e. placing the lid L on the base B. Thus, either before or after the objects which the box is to contain are placed therein, the lid L is moved downwardly onto the base, generally as in FIG. 4 but with the front edge of the lid tipped downwardly, so that tabs 28 may be slipped inside the front wall 13 of base B. Ribs 26 are, of course, inserted between the side walls 11 and 12 of the base, facilitated by the lower edges of the ribs 26 being rounded, as shown. Then, as soon as the lower edge of front flange 22 of the lid strikes the upper edge of front wall 13, of the box, the rear end of the lid is moved downwardly. As will be evident, the hinge pins 27 are thereby automatically guided into slots 19 and, upon downward pressure of the rear of the lid, pins 27 will snap through the narrower, lower portion of slots 19 and into holes 20. Although the above motions have been described separately, in reality they can be effected in about one second in a substantially continuous motion. In the embodiment of this invention shown, the sides of notches 19 diverge at an angle of approximately 30°, although other angles of divergence may be utilized. Also, the narrow part of each slot 19, at the intersection with hole 20, need be only a few thousandths of an inch less than the diameter of hinge pin 27, such as 0.005 in. for a hinge pin which is approximately 0.030 in. in diameter and for which hole 20 is approximately 0.040 in. in diameter, when the box is 1⅞ in. wide, 1⅞ in. deep and 13/16 in. high, in overall dimensions when closed. Of course, other sizes and other clearances or tolerances may be utilized, particularly for other sizes of boxes or for material which is more resilient or less resilient than polystyrene.

An alternative construction shown in FIGS. 7–9 operates in the same manner and has the same advantages of assembly, as the embodiment just described, but may be produced in a less expensive mold. Thus, the base B' thereof has an identical bottom 10, front wall and rear wall 14, but each side wall, such as side wall 11', is provided at the rear upper edge with an ear 32 which corresponds in extent to both ears 17 and 18 of FIG. 1. Also, a conical groove 33 extends downwardly from the upper edge of ear 32, at the same position as slot 19, and having edges at approximately the same angle as slot 19, but merges at its lower end with a hemispherical depression 34 having a radius approximately the same as the radius of hole 20. Similarly, lid L' is substantially identical to lid L, with the exception of a hemispherical nib 35 extending outwardly from each rib 26 at the same position as pin 27 and conveniently having the same radius. Thus, for a box having the size indicated, nibs 35 may have a radius of 0.015 in. and depressions 34 a radius of 0.020 in., while grooves 33 may be 0.065 in. wide at the upper end and 0.015 in. deep at the top of 0.005 in. deep at the bottom. Other dimensions may, of course, be utilized, particularly for other sizes of boxes. As will be evident, lid L' of FIGS. 7–9 will pivot about ribs 35 in depressions 34 of base 8', during opening and closing. Also, lid L' and base B' may be assembled in the same manner as lid L and base B, as by placing the lid tabs 28 inside the front wall 13 of the base and pressing the rear edge of the lid onto the base, since ribs 35 will be guided into grooves 33 and then will snap into depressions 34.

The mold for producing lids L and L' may be substantially identical, except for the production of pins 27 in the one instance and ribs 35 in the other. However, the mold for producing base B normally requires cores, which produce notch 19 and hole 20 at each side and which are each moved outwardly before the base is stripped from the mold, whereas the mold for producing base B' does not require such a mold, as the base may be stripped from the male half of the mold, since depressions 34 in the side walls of the base are above rear wall 14 and the side walls will snap past the mold projection forming depression 34, the latter moving into and along grooves 33 during stripping.

From the foregoing, it will be evident that a receptacle constructed in accordance with this invention fulfills to a marked degree the requirements and objects hereinbefore set forth. The box is light in weight yet strong and durable in construction, the lid being reinforced by ribs 26 and depending flanges 22 and 23. The box may be easily manufactured, as by molding, and is extremely easy to assemble, assembly being facilitated by the slots 19 of one embodiment and the grooves 33 of the other embodiment. The tabs 28 of the lid not only are disposed inside the box, providing a smooth exterior, and frictionally hold the lid closed, but also assist in the rapid assembly through engagement with the inside of the front wall of the base to position the hinge pins or nibs for guidance by the slots or grooves into the holes or depressions. Furthermore, the rib 26 of the lid and the interfitting grooves and flanges of the rear wall and rear flange, respectively, of the base and lid, prevent the loss of any articles within the receptacle.

Although two preferred embodiments of this invention have been illustrated and described, it will be understood that other embodiments may exist and various changes and variations made, without departing from the spirit and scope of this invention.

What is claimed is:

1. A receptacle formed of plastic and the like comprising a base having a bottom and upstanding front back and side walls integrally joined, each said side wall extending upwardly beyond said front and rear walls and having an upstanding ear at the rear thereof provided with a transverse hole on the inside and a downwardly extending and converging slot extending into said hole; and a lid having a top overlying said side walls of said base, except at said ears, a pair of parallel ribs depending from and spaced inwardly from the side edges of said top a distance slightly greater than the thickness of the respective side wall of said base so as to fit tightly inside said side walls of said base, a front flange depending from said top and adapted to engage the upper edge of said front wall of said base, a pair of front tabs depending from the inside of said front flange and adapted to frictionally engage the inside of said front wall of said base, a rear flange depending from said top adapted to engage the upper edge of said rear wall of said base, said rear depending flange of said lid and said rear wall of said base having interfitting grooves providing flanges disposed in abutting relationship when said lid is closed, and a projection extending outwardly from each said rib at the rear thereof adapted to engage said transverse hole in the corresponding ear of said base, said projections being spaced from said front tabs a distance such that said front tabs are urged against the inside of said front wall when said lid is closed.

2. A receptacle, as defined in claim 1, wherein each said hole extends through the corresponding ear.

3. A receptacle, as defined in claim 1 wherein each said hole extends only partially but not completely through the corresponding ear.

References Cited in the file of this patent

UNITED STATES PATENTS

| | | |
|---|---|---|
| 1,679,231 | Sherman et al. | July 31, 1928 |
| 2,393,568 | Root | Jan. 22, 1946 |
| 2,464,017 | Berghorn | Mar. 8, 1949 |
| 2,580,310 | Magnenat | Dec. 25, 1951 |
| 2,604,205 | Patterson | July 22, 1952 |
| 2,765,949 | Hillman | Oct. 9, 1956 |
| 2,940,760 | Brinkman | June 14, 1960 |

FOREIGN PATENTS

| | | |
|---|---|---|
| 167,668 | Switzerland | June 1, 1934 |
| 494,920 | Great Britain | Nov. 3, 1938 |
| 531,994 | Canada | Oct. 23, 1956 |